United States Patent [19]

Meritis

[11] 4,320,922
[45] Mar. 23, 1982

[54] STORABLE AUTOMOTIVE SEAT COVER

[76] Inventor: Alexanderos Meritis, 419 N. Linwood Ave., Baltimore, Md. 21224

[21] Appl. No.: 131,718

[22] Filed: Mar. 19, 1980

[51] Int. Cl.³ ............................................. A47C 31/10
[52] U.S. Cl. .................................. 297/220; 160/301; 297/184; 297/229
[58] Field of Search ............... 297/229, 221, 222, 220, 297/184, 219; 160/301; 5/488

[56] References Cited

U.S. PATENT DOCUMENTS

| | | | |
|---|---|---|---|
| 1,217,652 | 2/1917 | Spahr | 297/222 |
| 1,985,222 | 12/1934 | Menhall | 297/229 X |
| 2,339,828 | 1/1944 | Worth | 297/222 X |
| 2,532,867 | 12/1950 | Toms | 160/301 |
| 2,536,592 | 1/1951 | Caesar et al. | 297/221 |
| 2,773,547 | 12/1956 | Voss | 160/301 |
| 2,804,914 | 9/1957 | Butcko et al. | 297/229 |
| 4,118,066 | 10/1978 | Ricke | 297/184 |
| 4,206,945 | 1/1980 | Kifferstein | 297/220 |

FOREIGN PATENT DOCUMENTS

| | | | |
|---|---|---|---|
| 502898 | 5/1951 | Belgium | 5/488 |
| 420511 | 11/1910 | France | 297/229 |
| 1162144 | 4/1958 | France | 297/229 |

*Primary Examiner*—James T. McCall
*Attorney, Agent, or Firm*—Walter G. Finch

[57] ABSTRACT

The invention is a seat cover that can be stored when not in use or when not needed without the complicated process of totally removing it from the seat. The invention consists of a rollable seat cover that will self-wind when activated. The seat cover is fitted into and stores within the head rest on the seat. The seat cover also crosses over and covers the head rest as well.

9 Claims, 4 Drawing Figures

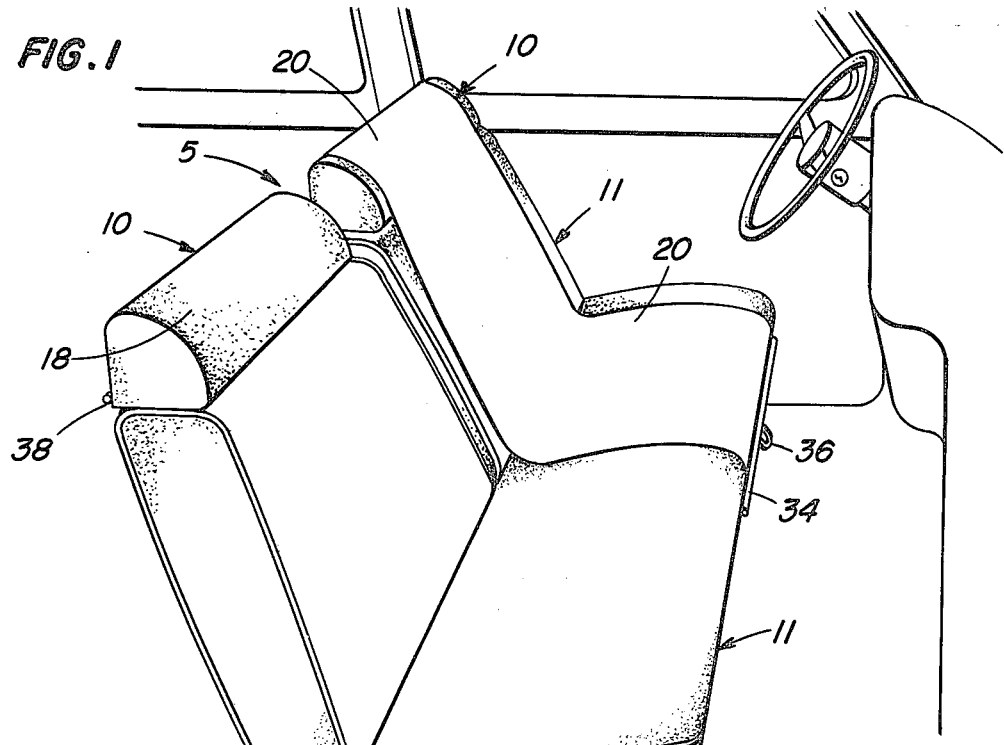
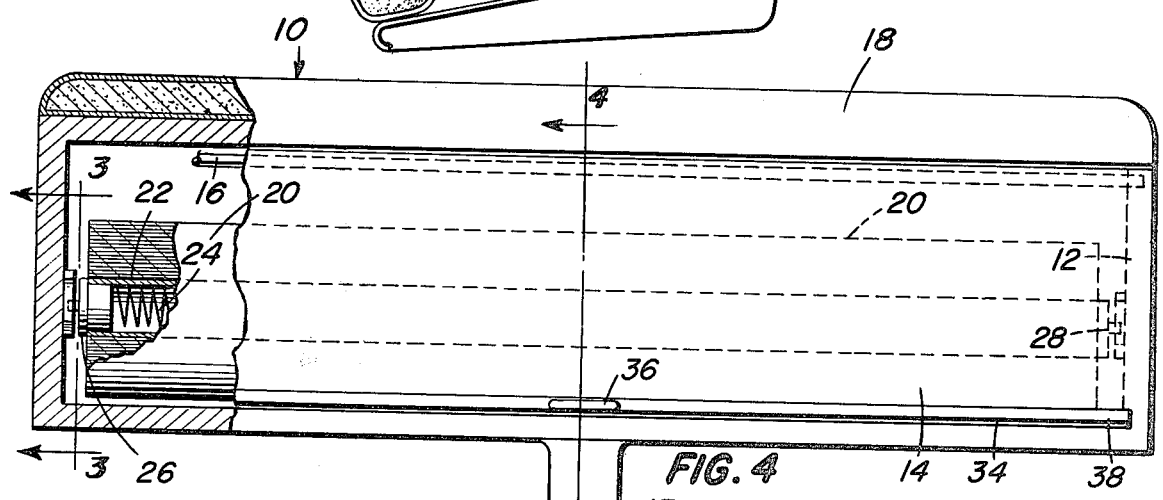
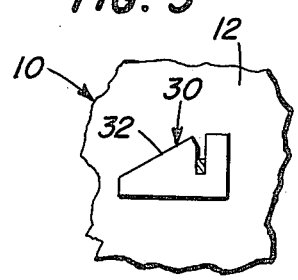
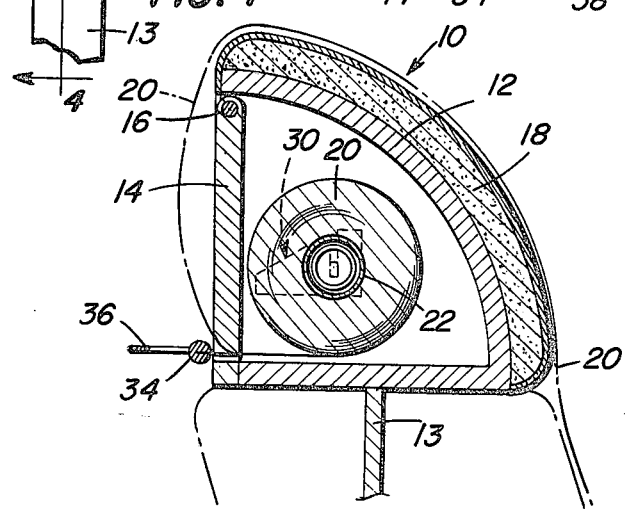

STORABLE AUTOMOTIVE SEAT COVER

BACKGROUND AND SUMMARY OF THE INVENTION

The invention relates to covers and in particular to seat covers. Specifically, the invention relates to automotive seat covers and in this invention to automotive seat covers that are storable without total removal from the seat.

A need has existed for a long time for a seat cover that can be removed easily from the seat when not in use, when not needed, or when they are to be cleaned.

In the present state of the art for automotive seat covers, the seat covers are held to the seat by a complicated elastic band system and/or a system of hooks. The problem of getting the elastic band system around the seat and the seat back is a difficult one. In some cases cloth-like ties are used instead of the elastic means. Often a system of hooks is used in conjunction with the elastic band system or the cloth-like ties. In some cases the hooks are used independently. It is, likewise, a difficult problem to attach the hooks to the seat while applying the seat cover to the seat back and the seat. Similar difficulties are encountered when the seat cover is to be removed for cleaning or replacement.

In the present invention the seat cover is stored in a rolled-up manner on a rod-like member. The rolled-up unit is affixed to and inside the head rest on the seat when not in use.

When the seat cover is to be used it is withdrawn, in a manner similar to a window shade, passed over the head rest and down over the back of the seat and then across the seat itself. Thus, the seat cover protects not only the seat and seat back, but also the head rest. Normal seat covers do not protect the covering of the head rest.

When the seat cover is not required or is not in use it can be automatically rolled-up on the rod-like member by an internal spring system similar to a window shade. It is easily removed for cleaning or replacement.

It is, therefore, an object of the invention to provide an automotive seat cover that is storable without total removal from the seat system.

It is another object of the invention to provide an automotive seat cover that is stored in a rolled-up manner.

It is still another object of the invention to provide an automotive seat cover that is affixed to and within the head rest on the automotive seat.

It is yet another object of the invention to provide an automotive seat cover that will cover the head rest as well as the seat back and the seat.

It is also an object of the invention to provide an automotive seat cover that will automatically roll-up for storage.

It is also another object of the invention to provide an automotive seat cover that can be removed easily for cleaning or replacement.

Further objects and advantages of the invention will become more apparent in the light of the following description of the preferred embodiments.

BRIEF DESCRIPTION OF THE DRAWINGS

FIG. 1 is a pictorial representation of a storable automotive seat cover showing it in both the stored and usable positions;

FIG. 2 is a partial sectional view of a storable automotive seat cover affixed inside a head rest;

FIG. 3 is a partial sectional view of the support for a storable automotive seat cover on line 3—3 of FIG. 2; and FIG. 4 is a cross sectional view of a storable automotive seat cover on line 4—4 of FIG. 2.

DESCRIPTION OF THE PREFERRED EMBODIMENTS

Referring to the drawings and particularly to FIG. 1, a storable automotive seat cover is shown at 5. Of the two seat positions shown in FIG. 1, the storable automotive seat cover 5 is shown extended and in the usable position on the seat directly behind the steering wheel (the driver's seat) and in the stored position (inside the head rest) on the seat next to the driver's position (the passenger's seat).

Referring again to FIG. 1, at the driver's seat position the seat cover 20 of the storable automotive seat cover 5 has been withdrawn from the storage position inside the head rest (described hereinafter), pulled across the head rest 10 on the driver's side, then down and over the seat back and the seat 11 of the driver's side.

In the aforementioned positioning of the seat cover 20 on the driver's side, the seat cover not only protects the seat back and seat 11, but also the padding 18 of the head rest 10. The padding 18 can be seen more clearly on the head rest 10 on the passenger's seat where the storable automotive seat cover 5 is in the stored position as hereinafter described.

The means for withdrawing the seat cover 20 from the storage means inside the head rest 10 is a finger ring or loop 36 on the end of the seat cover 20. A rod-like member 34 affixed to the end of the seat cover 20 provides an even pull on and across the seat cover 20 when withdrawn from the stored position by the finger ring or loop 36. The rod-like member 34 may be wood, metal, plastics, or any other suitable material. Such material also provides a means for anchoring or fastening the finger ring 36. The finger ring or loop 36 may be of a rigid material or may be flexible such as a cloth or cotton-like material.

The ends 38 of the rod-like member 34 extend beyond the sides of seat cover 20 to serve as a stop for the seat cover 20 when it is being rolled-up for storage as hereinafter described. The finger ring or loop 36 and the rod-like member 34 can be seen in FIG. 1 at the driver's seat. One end 38 of the rod-like member 34 can be seen at the passenger's seat where it serves as a stop when the seat cover 20 is stored as hereinafter described.

Turning now to FIGS. 2 and 4, the padding 18 of the head rest 10 can be seen in both figures. In FIGS. 2 and 4 the seat cover 20 is shown rolled-up in storage position and will be described in detail hereinafter. In FIG. 4 the seat cover 20 is also shown in phantom in a withdrawn position starting at the bottom side of the rear of the head rest 10 and passing up the back of the head rest 10 and over the top and down the front side. In this manner the seat cover 20 protects the padding 18 on the head rest 10 which ordinary seat covers do not do. If protection of the head rest is desired with ordinary seat covers a separate cover is required.

The head rest support 13 that is used for adjusting the height position of the head rest 10 can be seen in both FIGS. 2 and 4. In the present invention the adjusting of the head rest 10 to various positions does not interfere with the operation and use of the storable automotive seat cover 5.

To house the storable automotive seat cover 5, the head rest 10 is constructed as a hollow body. The hollow body has a frame 12 which has a flat bottom and a curved portion that encloses what would be the "front" and "top" as can be seen in FIG. 4. The ends of the frame 12 are also enclosed as can be seen in FIG. 2. The curved portion of the frame 12 is covered on the exterior with the padding 18 and its upholstery material which can be seen in both FIGS. 2 and 4. The bottom of the frame 12 is affixed to the head rest support 13.

As thus constructed, the hollow head rest 10 is open at the rear side, an access door 14, hanging on a hinge pin or rod 16 to support the access door, serves to enclose the rear side of the hollow head rest 10. Suitable means for supporting the hinge pin or rod 16 are provided at the end enclosures of the frame 12. Suitable detent means (not shown) are provided to hold the access door in a closed position. The access door 14 has a clearance slot or opening at the bottom between the access door 14 and the bottom of the frame 12 to permit the seat cover 20 to pass through it.

The seat cover 20 is suitably fastened to and rolled-up on a cylindrical core member 22. The core member 22 operates similar to a window shade roller having a torsion spring 24, a ratchet end 26, and a spindle end 28. The ratchet end 26 and the spindle end 28 are held in suitable supports at each end which are fastened to the inside surface of the end enclosure of the frame 12.

The support 30 at the ratchet end 26 is shown in FIG. 3. The support 30 has an inclined surface 32 for easy insertion of the bar-like configuration of the ratchet end 26 into the holding slot of the support 30. The bar-like end of the ratchet end 26 is slidably pushed up the inclined surface 32 until the bar-like end drops into the slot in the support 30.

When the seat cover 20 is to be cleaned or replaced it can be removed by opening the access door 14 and lifting out the rolled seat cover 20 on the cylindrical core 22. The seat cover 20 can then be removed for cleaning or replacement and when reassembled placed back into the enclosure as hereinbefore described.

When the seat cover 20 is to be used, the seat cover 20 is withdrawn through the slot between the access door 14 and the bottom of the frame 12. The withdrawal is performed by pulling on the finger ring or loop 36 which exerts an even pull on the seat cover 20 by means of the rod-like member 34. As hereinbefore described, the seat cover 20 is drawn out of the head rest enclosure through the slot, up the back of the head rest 10 and over the top and down the front of the head rest 10 and then down the back and across the seat 11. If desired, the seat cover 20 may be tucked in at the juncture of the seat back and the seat proper.

The seat cover 20 is made of suitable fabric-like material to protect the head rest 10 and the seat back and seat 11 and of flexible characteristics that will roll-up when stored.

When the seat cover 20 is to be stored, the ratchet mechanism in the ratchet end 26 is operated similar to a window shade and the seat cover 20 is automatically rolled-up on the cylindrical core 22 as it passes back through the slot between the access door 14 and the bottom of the frame 12.

When the seat cover 20 is completely rolled the ends 38 of the rod-like member 34 come to rest against the end enclosures of the frame 12 and thus stop the operation of the automatic rolling action of the ratchet end 26.

If desirable, the arrangement described and illustrated in the drawings for a storable automotive seat cover can be equally applied to any type of seat or chair, reclining chair, such as used in the home, industry, and in business.

As can be readily understood from the foregoing description of the invention, the present structure can be configured in different modes to provide a storable automotive seat cover.

Accordingly, modifications and variations to which the invention is susceptible may be practiced without departing from the scope and intent of the appended claims.

What is claimed is:

1. A storable automotive seat cover, comprising:
   an adjustable head rest, said head rest being suitably configured as a hollow, box-like, compartment, said hollow, box-like compartment having one side hinged as an access door, said access door being located on the rearward side of said head rest;
   a cylindrical core member, said cylindrical core member being affixed inside said hollow, box-like, compartment of said head rest, said cylindrical core member having a ratchet means at one end thereof;
   a seat cover fabric, said seat cover fabric being suitably affixed to said cylindrical core member and rolled-up thereon;
   a support means, said support means being affixed inside said head rest, said support means serving to affix said cylindrical core member inside said head rest, said support means having at least one inclined surface thereon and a holding slot, said inclined surface serving to guide said ratchet means into said holding slot.

2. The storable automotive seat cover as recited in claim 1, wherein said head rest configuration has a curved portion, said curved portion serving as the top and frontward side of said hollow, box-like, compartment, said curved portion being suitably padded, and a head rest support means, said head rest support means being suitably attached to said head rest and adjustably attached to an automotive type seat.

3. The storable automotive seat cover as recited in claim 2, wherein said access door is suitably hinged along the top-most edge and has a clearance slot between the bottom-most edge and the bottom of said hollow, box-like compartment to permit passage of said seat cover fabric.

4. The storable automotive seat cover as recited in claim 3, wherein said cylindrical core member additionally contains a torsion spring, a ratchet end, and a spindle end and operates in the manner of a window shade roller.

5. The storable automotive seat cover as recited in claim 4 and additionally, a rod-like member, said rod-like member being affixed to the end of said seat cover fabric opposite to end of said seat cover fabric affixed to said cylindrical core member, said rod-like member being of a suitable length greater than the width of said seat cover fabric to which said rod-like member is affixed, the ends of said rod-like member thereby extending past the side edges of said seat cover fabric, said extended ends serving as a stop means when said seat cover fabric is rolled-up on said cylindrical core means, wherein said extended ends of said rod-like member bear against the end portions of said hollow, rod-like, compartment, thereby preventing said rod-like member from passing to inside of said hollow, box-like, compartment.

6. The storable automotive seat cover as recited in claim 5 and additionally, a ring-like member affixed to said rod-like member to serve as a means of grasping and pulling said seat cover fabric from said hollow, box-like, compartment.

7. The storable automotive seat cover as recited in claim 6, wherein said seat cover fabric is withdrawn from said hollow, box-like, compartment and used to cover said head rest, and the back and seat portions of said automotive type seat, by pulling on said ring-like member to withdraw said seat cover fabric through said clearance slot, causing said seat cover fabric to unroll from said cylindrical core member for covering said head rest, and the back and seat portions of said automotive type seat as aforesaid.

8. The storable automotive seat cover as recited in claim 7, wherein said seat cover fabric is rerolled for storage in said hollow, box-like, compartment by operation of the mechanism of said ratchet end of said cylindrical core member, thereby causing said seat cover fabric to automatically roll up upon said cylindrical core member, said reroll action of said mechanism of said ratchet end being stopped when said extended ends of said rod-like member comes to bear against said end portions of said hollow, box-like, compartment.

9. A storable seat cover comprising: a compartment means, said compartment means being hollow, and box-like, said hollow, box-like compartment means having one side hinged as an access door, said access door being located on the rearward side of said compartment, said compartment being padded on the forward-most side thereof and serving as a headrest for the associated seat, said access door being suitably hinged along the top-most edge and has a clearance slot between the bottom-most edge and the bottom of said hollow, box-like compartment to permit passage of a seat cover fabric;

a cylindrical core member, said cylindrical core member being affixed inside said hollow, box-like, compartment means, said cylindrical core member having a ratchet means at one end thereof, said cylindrical core member having a torsion spring, a ratchet end, and a spindle end and operates in the manner of a window shade roller;

a seat cover fabric, said seat cover fabric being suitably affixed to said cylindrical core member and rolled up thereon;

a support means, said support means being affixed inside said compartment means, said support means serving to affix said cylindrical core member inside said compartment means, said support means having at least one inclined surface thereon and a holding slot, said inclined surface serving to guide said ratchet means into said holding slot;

a rod-like member, said rod-like member being affixed to the end of said seat cover fabric opposite to end of said seat cover fabric affixed to said cylindrical core member, said rod-like member being of a suitable length greater than the width of said seat cover fabric to which said rod-like member is affixed, the ends of said rod-like member thereby extending past the side edges of said seat cover fabric, said extended ends serving as a stop means when said seat cover fabric is rolled-up on said cylindrical core means, wherein said extended ends of said rod-like member bear against the end portions of said hollow, box-like, compartment, thereby preventing said rod-like member from passing to inside of said hollow, box-like, compartment means;

a ring-like member affixed to said rod-like member to serve as a means of grasping and pulling said seat cover fabric from said hollow box-like, compartment means.

* * * * *